US008770808B1

(12) United States Patent
Campbell et al.

(10) Patent No.: US 8,770,808 B1
(45) Date of Patent: Jul. 8, 2014

(54) BICYCLE TAIL LIGHT

(75) Inventors: Damon Campbell, Pacific Grove, CA (US); Roxanne Lo, Santa Cruz, CA (US); Christopher McCaslin, Alameda, CA (US); Doug Foss, Pacific Grove, CA (US); Daniel T. Emerson, Carmel, CA (US)

(73) Assignee: Light & Motion Industries, Marina, CA (US)

( * ) Notice: Subject to any disclaimer, the term of this patent is extended or adjusted under 35 U.S.C. 154(b) by 426 days.

(21) Appl. No.: 13/066,539

(22) Filed: Apr. 15, 2011

Related U.S. Application Data

(60) Provisional application No. 61/342,646, filed on Apr. 15, 2010.

(51) Int. Cl.
*F21V 33/00* (2006.01)
(52) U.S. Cl.
USPC ............ 362/473; 362/541; 362/549; 362/800
(58) Field of Classification Search
USPC .......... 362/473–476, 541, 549, 186, 190, 191
See application file for complete search history.

(56) References Cited

U.S. PATENT DOCUMENTS

| | | | | |
|---|---|---|---|---|
| 6,568,838 | B2 * | 5/2003 | Taylor et al. .................. | 362/474 |
| 2002/0093825 | A1 * | 7/2002 | Bailey ............................ | 362/473 |
| 2007/0247858 | A1 * | 10/2007 | Ford .............................. | 362/382 |
| 2009/0010015 | A1 * | 1/2009 | Carillo .......................... | 362/473 |
| 2010/0246199 | A1 * | 9/2010 | Ma et al. ....................... | 362/474 |
| 2011/0141751 | A1 * | 6/2011 | Wei ............................... | 362/428 |

\* cited by examiner

*Primary Examiner* — Jong-Suk (James) Lee
*Assistant Examiner* — Leah S Macchiarolo
(74) *Attorney, Agent, or Firm* — Thomas M. Freiburger

(57) ABSTRACT

A bicycle tail light has a casing containing LEDs and a battery, as well as a universal mounting for engaging a bicycle luggage rack, a chain stay, a seat post or a rider's messenger bag, backpack or clothing. A swivel mounting is included for adjusting the light to an appropriate tilt angle, depending on the position of the bicycle component on which the light's base is mounted. The tail light projects light from both sides as well as to the rear, providing over 180° of visibility. A micro USB charging port for the battery is located at the outside of the light casing.

10 Claims, 4 Drawing Sheets

US 8,770,808 B1

BICYCLE TAIL LIGHT

This application claims benefit of provisional application Ser. No. 61/342,646, filed Apr. 15, 2010.

BACKGROUND OF THE INVENTION

This invention concerns night lighting for bicycles, and specifically a tail light of high power and high visibility, as well as universal mounting capability.

Bicycle tail lights and reflectors are known in many forms. Typically these include brackets for securing to a seat post, rack or bicycle frame component. Most provide for only limited visibility of the rider and bicycle. One popular brand, for example, produces about 3.8 lumens of light in the rear facing direction. Normally the tail lights flash, both for conserving battery and for better attracting the attention of nearby drivers.

One problem with some prior tail lights was the need to remove the battery for recharging.

An objective of the invention is to improve over existing and conventional bike tail lights by providing a light of increased light output, visibility and wide angle of visibility, as well as easy removal and charging convenience.

SUMMARY OF THE INVENTION

The tail light of the invention has a casing containing LEDs and a battery, as well as a universal mounting for engaging a bicycle luggage rack, a chain stay, a seat post or a rider's messenger bag, backpack or clothing. A swivel mounting is included for adjusting the light to an appropriate tilt angle, depending on the position of the bicycle component on which the light's base is mounted.

The tail light preferably produces about 35 lumens of light, including rear and side-projected light. The side light preferably is amber. The lithium-ion battery in the light casing enables use preferably for about five hours on a charge, or at least a minimum of two hours.

In a preferred embodiment the tail light also includes a reflector for reflecting red light back toward headlights, etc.

Preferably the tail light has a micro USB charging port, a standard for cell phones, so that the light's battery can be charged using a cell phone charger or via a USB cable connected to a computer. Importantly, the charging port is at the exterior of the tail light's casing, so the battery need not be removed for charging.

With its angular adjustment to accommodate different mounting positions, more than 180° of light projection, and capability of attachment at various types of attachment points, the bike tail light of the invention exhibits a versatility unknown in prior bike tail lights. These and other objects, advantages and features of the invention will be apparent from the following description of a preferred embodiment, considered along with the accompanying drawings.

DESCRIPTION OF PREFERRED EMBODIMENTS

Figure 1:
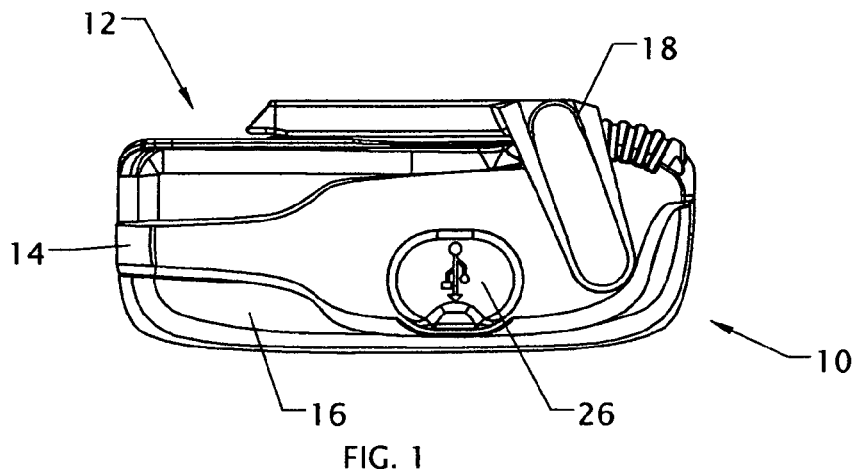
FIGS. 1, 2 and 3 are left side, rear and right side views of the bicycle tail light of the invention.
Figure 2:
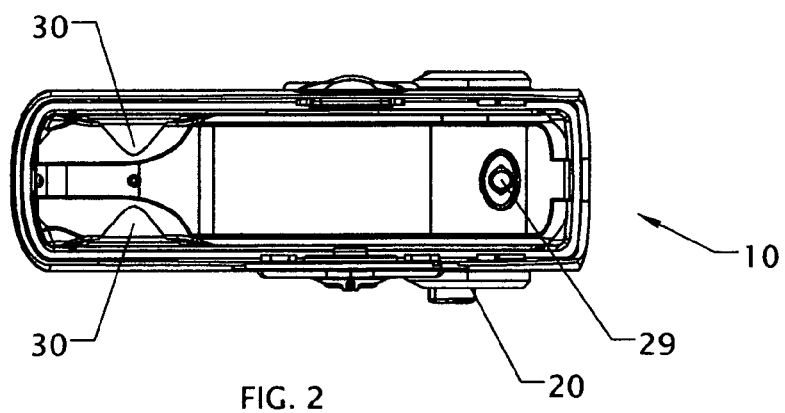
Figure 3:
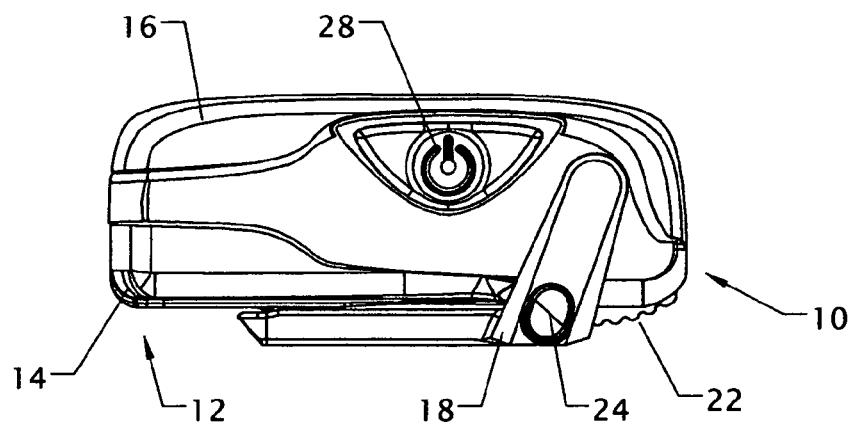

In the drawings, FIGS. 1, 2 and 3 show a tail light 10 of the invention comprising a casing 12 that includes a casing shell 14 and a cover 16 that forms a rear side of the light assembly, from which light is directed. The light assembly further includes a mounting base 18 that is pivotally connected at 20 to the casing, to provide for adjustment of the angle of the tail light casing 12 with respect to the mounting base 18. This enables the device to be oriented in appropriate generally rearward-facing direction without regard to where on a bicycle or on a rider's backpack, clothing or other gear the device is attached. The pivot adjustment includes a locking feature for selected positions. This is shown in this preferred embodiment by a rack of teeth 22 on what would be the forward side of the casing in use. The mounting base has an engaging pawl 24, the engagement end of which is visible in FIG. 3, which is pushed in to release a locked position and released to engage a new locking position. This mechanism is further explained below.

FIGS. 1, 2 and 3 also show a rubber access door 26 on one side of the casing for access to a micro USB charging port for a rechargeable (preferably lithium-ion) battery contained in the casing, and an on/off push-button switch 28 on the other side of the casing. The tail light may have only two settings, ON and OFF, and in a preferred embodiment the light from the device is flashing. Alternatively, the user can select a setting, steady on or flashing, including for side lights discussed below, by pushing the switch button a prescribed number of times. Also shown in these views is a red light-projecting LED 29, and left and right windows 30 for side lights, preferably amber light, to provide 180° or greater visibility of the position of a bicycle.

Figure 4:
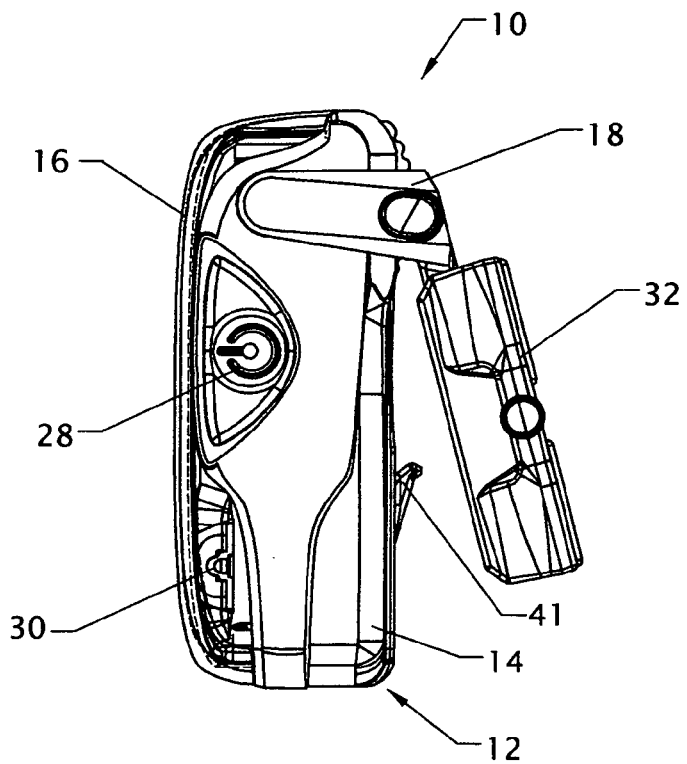
FIG. 4 is a side view of the tail light showing a mounting base at a selected angular position.

FIG. 4 shows the tail light 10 with the mounting base 18 with the casing 12 rotated to one selected angle relative to the mounting base 18. The mounting base 18 is shown secured to a bike mount 32, this latter component being configured to receive a strap as discussed below. In FIG. 4 one side window 30 is visible, as is the on/off switch 28.

Figure 5:
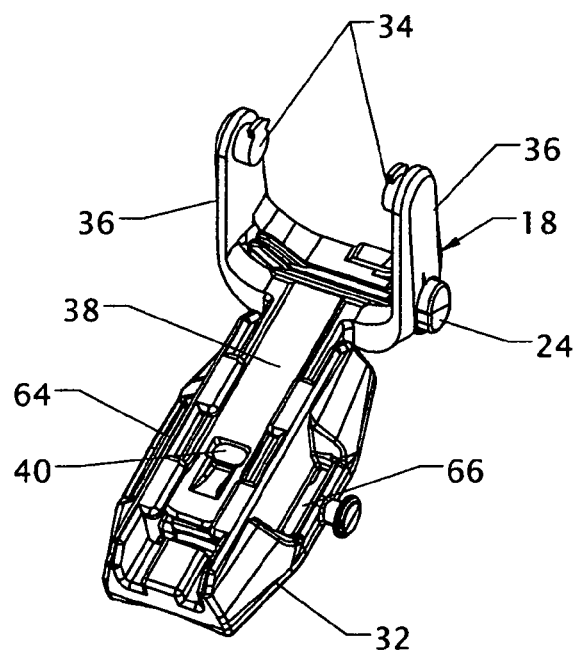
FIG. 5 is a perspective view showing the mounting base and a bike mount.

FIG. 5 shows details of the mounting base 18 and its interconnection with the bike mount 32. Pivot elements 34 are shown on arms 36 of the mounting base. A main prong or leg 38 of the mounting base slides into and locks into position with the bike mount 32. A locking nipple of the bike mount is seen at 40. This pops up into place as shown when the leg 38 is fully inserted. To retract the locking nipple 40, one can collapse the casing 12 fully against the leg 38 and the bike mount 32 causing a pin or prong 41 (FIG. 4) to press against and release the locking nipple 40. This allows the mounting base 18 to be pulled out when desired. In this way the bike mount 32 can be left on the bicycle or other article while the light itself is removed for security or for charging. What is illustrated represents only one example of a connection between the mounting base and the bike mount; other arrangements can be used.

Figure 6:
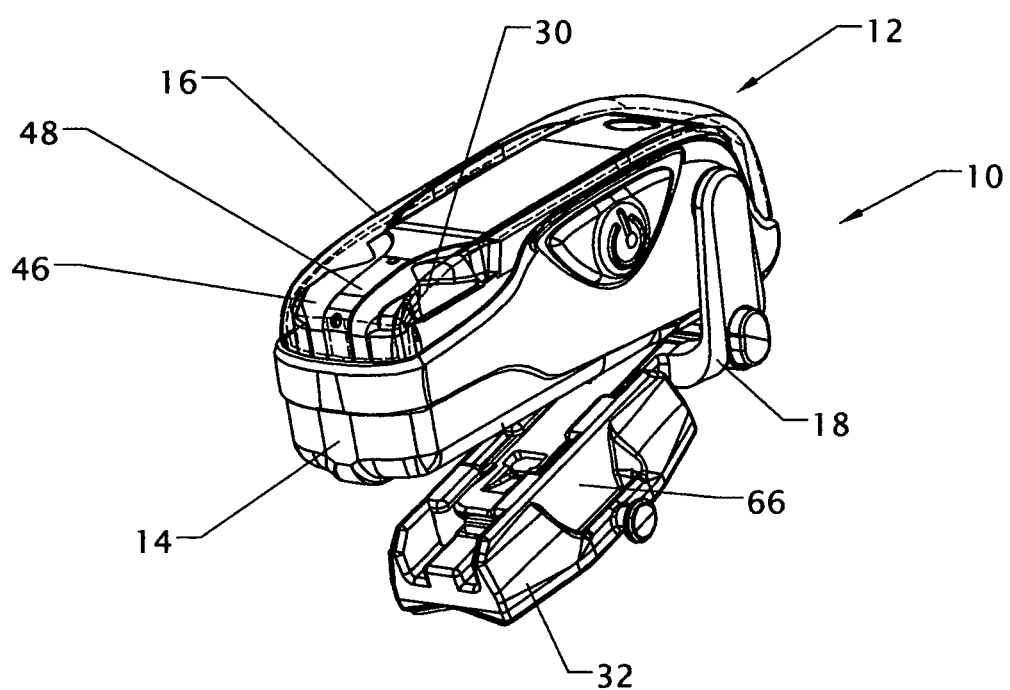
FIG. 6 is a perspective view of the tail light.

FIG. 6 shows the tail light 10 with the mounting base 18 and connected bike mount 32 at a set angle as desired by a user. As in the previous views the mounting strap for the bike mount 32 is not shown. This view shows that the casing cover 16 can be a transparent or substantially transparent plastic cover, fixedly secured to the casing shell 14 and covering a light directing shield 46 with an attached reflector strip 48 inside the casing.

Figure 7:
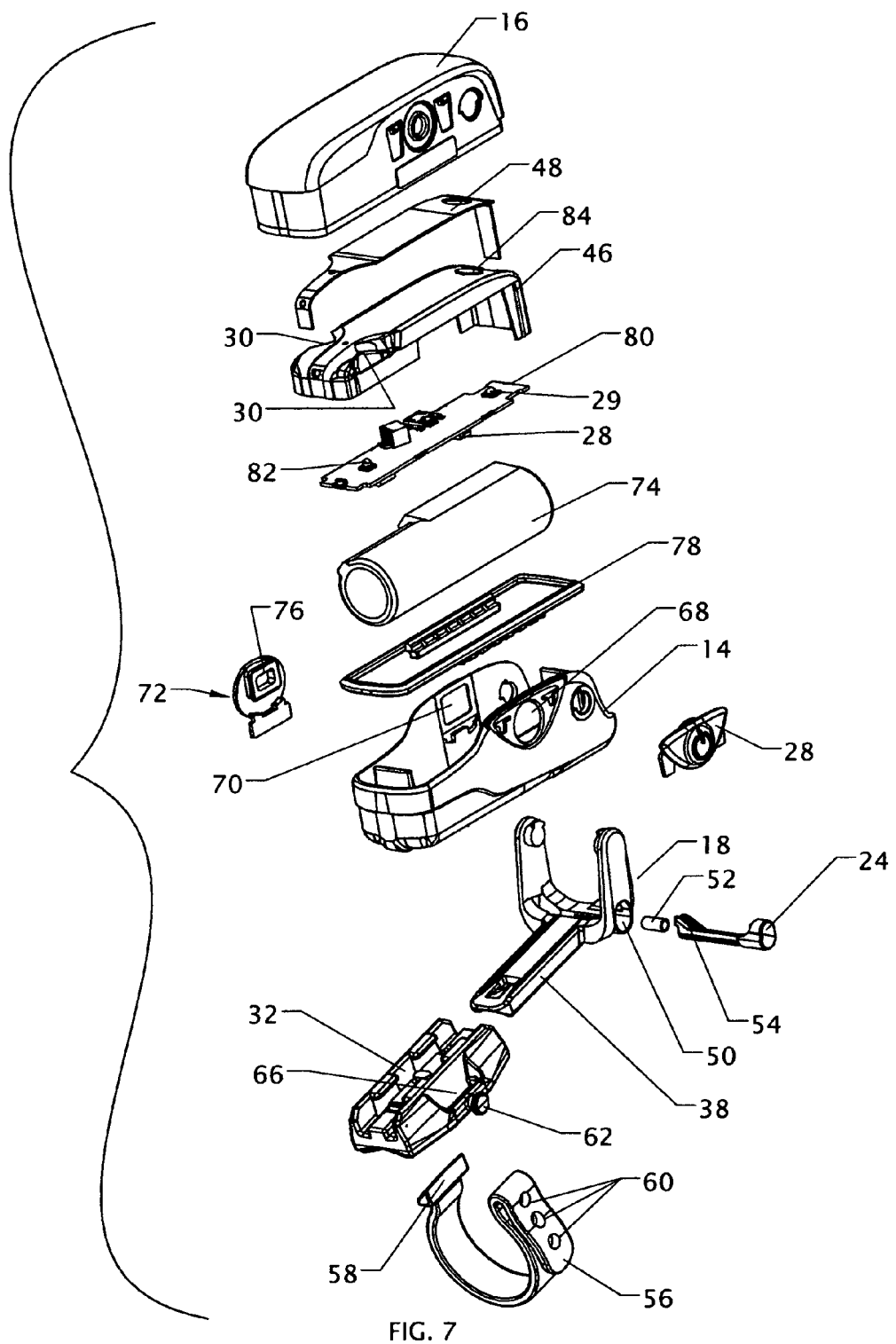
FIG. 7 is an exploded view showing assembly of components of the tail light.

FIG. 7 shows, in exploded view, the major components and assembly of the components of the tail light of the invention in a preferred embodiment. As shown, the mounting base 18 receives the locking latch 24 through an opening 50 that includes a slot along the deep side of the mounting base 18 as seen in FIG. 7. A small compression spring 52 can be provided, or other spring means can be used, to bias the latch device 24 outwardly. Once the latch 24 is in place and the mounting base 18 is secured over the casing as shown in the views described above, the locking latch 24 is captured in place. The spring pushes a locking pawl 54 of the latch into engagement between teeth 22 of the casing for setting a desired angular position. The bike mount bracket 32 is shown separated from the mounting base, and with the mounting base's main prong or leg 38 in position to slide into the bike mount 32. Also shown schematically is a bike mount strap 56 with an enlarged end 58 acting as a stop, and position locking holes 60 for slipping over a button head 62 on the side of the bike mount after the strap has been tightened as desired. The strap slips through a strap slot 64 (best seen in FIG. 5) until the stop 58 fixes it in position, and the free end with the holes 60 extends up through a slot 66 at the other side, this slot being seen in FIGS. 5, 6 and 7.

FIG. 7 indicates the casing shell 14 to which the on/off button 28 is assembled, at a circular opening 68 at one side of the shell. A rectangular window 70 is shown at the opposite side of the shell, to receive the micro USB charging plug 72. A rechargeable battery is shown at 74, contained in the casing. A bezel or grommet-like frame 76 is shown for assembly into the rectangular window 70. A gasket is seen at 78, to be engaged between the shell 14 and the cover 16. The casing shell 14 preferably is of metal to act as a heat sink to disperse the heat of the LED lamps contained in the casing.

A printed circuit board is shown at 80, and in this preferred embodiment the PC board has two LED lamps 82 and 29 (this latter lamp also being indicated in FIG. 2). The switch 28 is appropriately connected to switch these LED lamps on and off. As noted above, in one embodiment both lamps can be constantly flashing, but other illuminating status could be used for the two LEDs. For example, the LED 82 for projecting amber light (by projection through an amber window) could be constantly on, while the LED 29 projecting red light flashes. The switch could be wired to select different illumination statuses, such as optionally having the red light on steadily.

Above the PC board 80 as seen in FIG. 7 is the light focusing/reflecting shroud or shield 46. A reflector opening 84 acts as a reflector for the desired appropriate angle for red light projection. Side light directing reflectors 30 appropriately direct side light from the LED 82 (preferably amber), toward both sides. The reflector strip 48 is secured down, as by adhesion, to the shroud or shield 46.

As noted above, in a preferred embodiment the tail light of the invention will operate preferably up to five hours on a charge, and preferably produces about 35 lumens light. The overall weight of the assembled device preferably is no more than about 110 grams. Charge time may be about 2.5 hours for a lithium-ion battery, and charging is conveniently accomplished with the micro USB port as discussed above, using virtually any cell phone charging cord of modern standard, or using a USB cable connected to a computer. With the bike mount strap as described above, the device provides for tool-free quick connection and quick release to a seat post, seat stay or other bicycle frame element, or even to a helmet. In addition, the bike mount 32 can be removed from the mounting base 18, and the mounting base can be used a clip to attach the tail light to a backpack, other gear or an article of clothing.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. An adjustable, versatile-mounting bicycle tail light, comprising:

a casing containing a battery and at least one LED light source, said one LED projecting red light through the casing in a rear direction from the casing, a universal mounting connected to the casing, enabling connection of the tail light to a bicycle luggage rack, chain stay, seat post or a bicycle rider's backpack or clothing, the universal mounting including a mounting base secured to the casing in a swivel connection about a pivot axis transverse to the casing as mounted on a bicycle and facing rear, allowing single-axis angular adjustment of the casing relative to the mounting base and thus adjustment of the aim of the LED up or down while projecting light in the rear direction, the universal mounting further including a bike mount with means for connection to a bicycle luggage rack, chain stay, seat post or a bicycle rider's backpack or clothing, the bike mount securable to the mounting base and quickly separable therefrom without tools, and the swivel connection of the mounting base and the casing being the sole swivel or pivoting feature of the bicycle tail light.

2. The bicycle tail light of claim 1, wherein the mounting base includes a leg engageable in a slot of the bike mount for engagement and disengagement with the bike mount, the leg moving with the mounting base in pivoting angular adjustment and having a closed position against the casing in parallel relationship with the casing, and the mounting base including a manually operated locking device enabling locking of a series of different angular positions of the mounting base relative to the casing, so that, without the bike mount the casing and mounting base can be pivoted and locked with the leg close to the casing to pinch a part of a bicycle rider's backpack or clothing or other flexible element between the leg and the casing to retain the bike light in place on the backpack, clothing or other element.

3. The bicycle tail light of claim 2, wherein the casing includes a micro USB charging port accessible at exterior of the casing, the battery being rechargeable via the micro USB port.

4. The bicycle tail light of claim 2, wherein the bike mount has a locking nipple configured to pop up into a locking position engaged in an opening of the leg when the leg is fully pushed into the slot of the bike mount, and wherein the casing includes a pin or prong projected at a position adjacent to and aligned with the locking nipple, such that to release the bike mount from the mounting base, the casing can be pushed firmly against the leg and the bike mount, pushing the locking nipple inward of the bike mount and allowing the sliding release of the leg from the slot to remove the casing and mounting base from the bike mount.

5. The bicycle tail light of claim 1, wherein the mounting base includes a manually operated locking device enabling locking of a series of different angular positions of the mounting base relative to the casing.

6. The bicycle tail light of claim 1, wherein the tail light includes means for projecting LED light from both left and right sides of the casing, as well as to the rear from the casing, wherein the tail light is viewable from at least 180°.

7. The bicycle tail light of claim 6, wherein a second LED is included in the casing for projecting LED light from both left and right sides of the casing, with reflectors in the casing positioned to reflect light from said second LED to left and right sides.

8. The bicycle tail light of claim 1, wherein the bike mount's means for connection includes an adjustable-length strap for engaging over a portion of a bicycle.

9. The bicycle tail light of claim 1, wherein the swiveling of the mounting base on the casing enables the mounting base to be pivoted and locked with the leg close to the casing, whereby a portion of a bicycle rider's backpack or clothing or other flexible element can be pinched between the leg and the casing to retain the bike light in place on the backpack, clothing or other element.

10. The bicycle tail light of claim 1, wherein the swivel connection of the mounting base to the casing comprises a pair of arms of the mounting base pivotally engaged with sides of the casing.

* * * * *